Nov. 5, 1968   H. G. INHOFER   3,408,901
COORDINATED HYDRAULIC MOTOR CONTROL SYSTEM AND
PRESSURE COORDINATING VALVE THEREFOR
Original Filed Nov. 19, 1964                           2 Sheets-Sheet 1
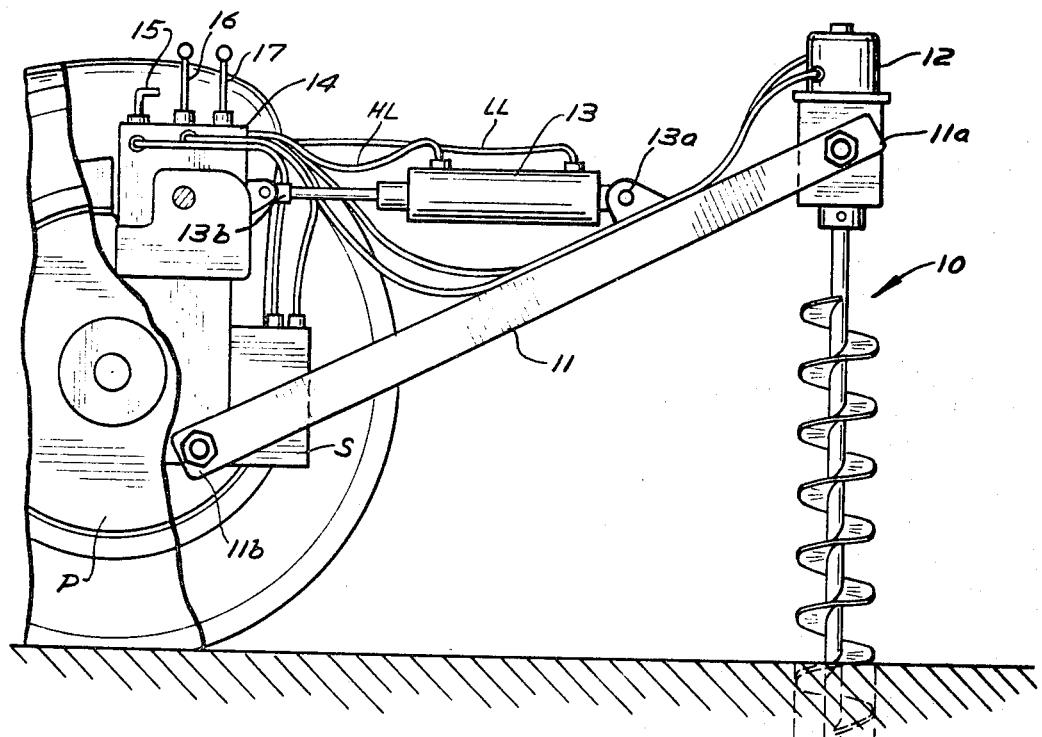
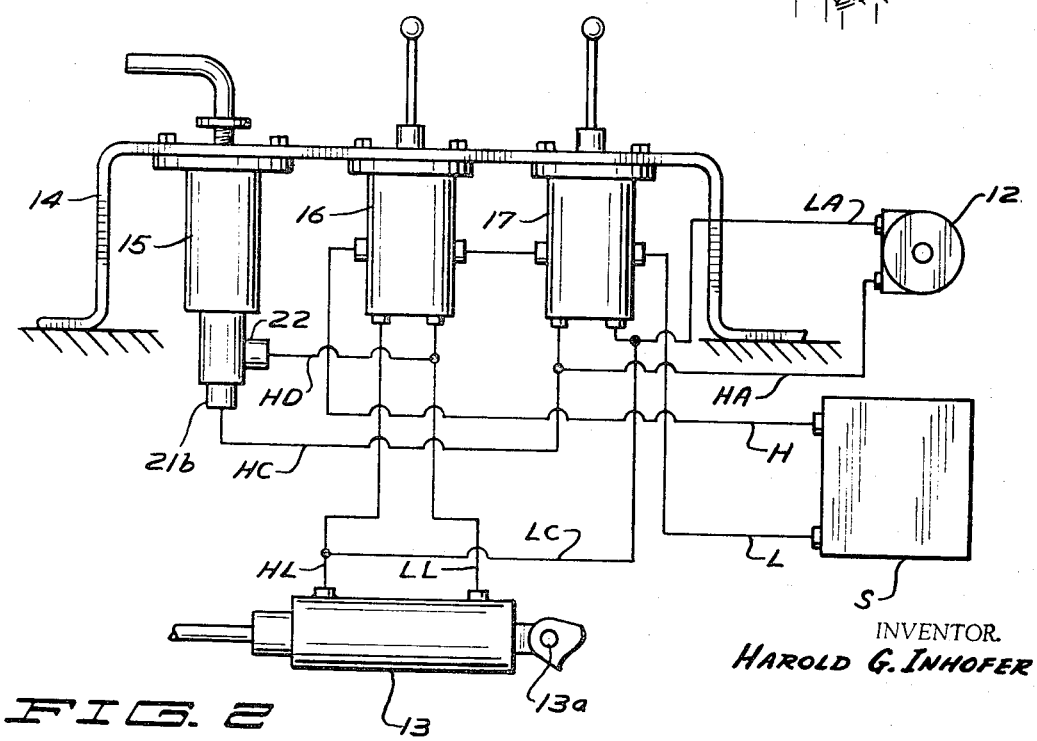
INVENTOR.
HAROLD G. INHOFER

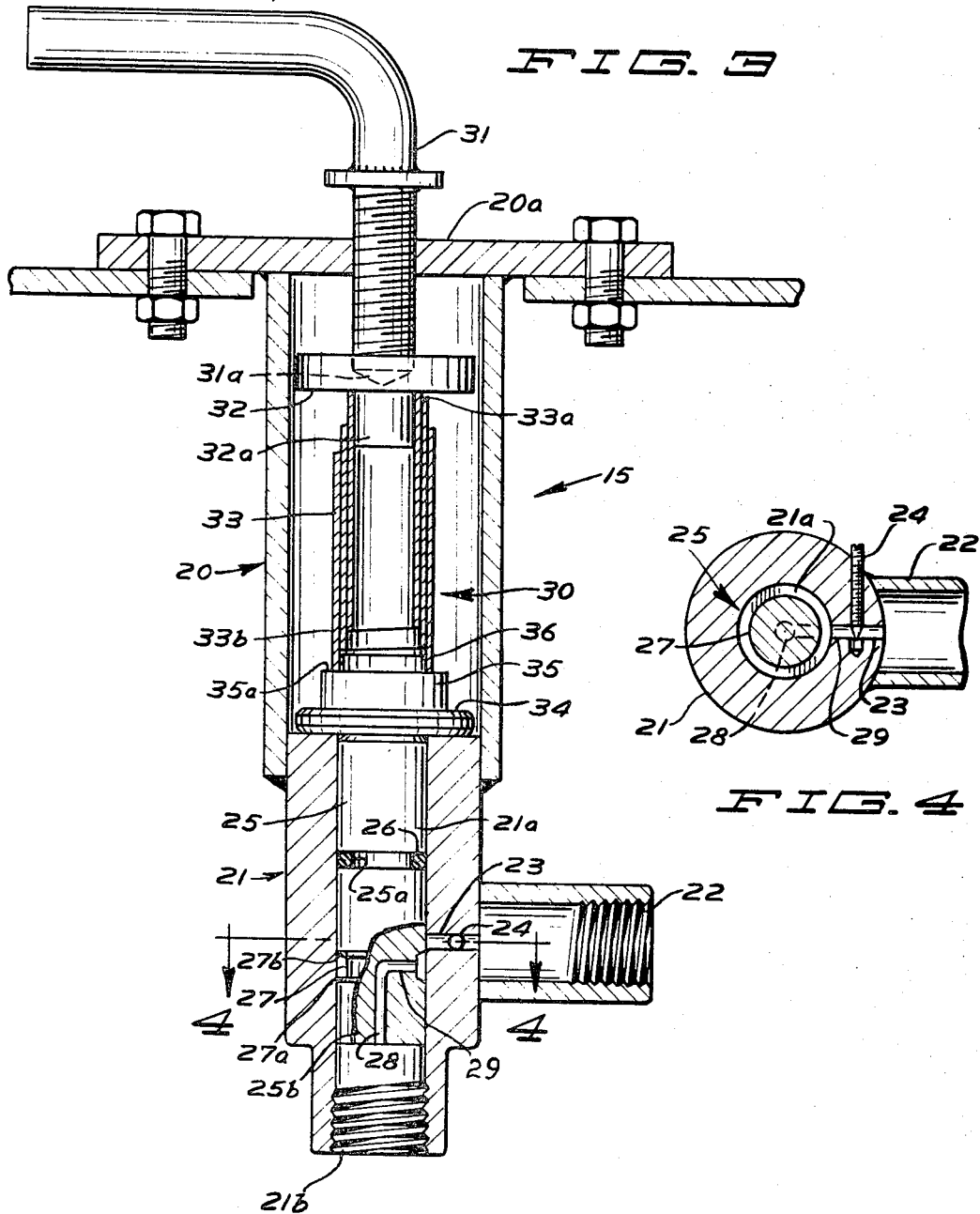

United States Patent Office 3,408,901
Patented Nov. 5, 1968

3,408,901
COORDINATED HYDRAULIC MOTOR CONTROL SYSTEM AND PRESSURE COORDINATING VALVE THEREFOR
Harold G. Inhofer, Eden Prairie, Minn., assignor to Hawk Bilt Mfg. Corp., a corporation of Iowa
Continuation of application Ser. No. 527,991, Feb. 16, 1966, which is a continuation of application Ser. No. 412,418, Nov. 19, 1964. This application Dec. 18, 1967, Ser. No. 697,547
13 Claims. (Cl. 91—412)

ABSTRACT OF THE DISCLOSURE

A hydraulic pressure control system which interrelates the actions of a pair of fluid motors by providing the system with a normally closed pressure compensating valve which opens in response to back pressure created by operation of the first motor to permit operation of the second motor, which remains open to operate the second motor through a predetermined range of back pressure, and which closes when the back pressure reaches a predetermined level to interrupt operation of the second motor; and the pressure compensating valve for controlling the system.

---

This application is a continuation of my copending patent application Ser. No. 527,991, filed Feb. 16, 1966, now abandoned, which in turn was a continuation of my patent application Ser. No. 412,418, filed Nov. 19, 1964, now abandoned.

Background of the invention

Many hydraulic systems require exertion of forces in two directions or two motions at the same time. This is true in a system for boring holes as both a rotary motion and an axial motion must be provided. As long as these motions are unimpeded the hydraulic system works perfectly but when one of the motions becomes impeded then the system must be compensated in order to bring the system back into proper working relation. In most cases this compensation is done manually and thus requires a somewhat skilled operator. With the device of this invention it is possible to precorrelate the motion of two related hydraulic actuators such that when the action of one becomes impeded a compensating factor will be automatically introduced such that the unit will overcome the impedance and return to the normal desired operating situation.

Summary of the invention

In order to best illustrate the operation of this valve this invention is illustrated as controlling a hydraulically operated post hole digger which is provided with a rotary auger and a lift cylinder. It should initially be understood that the subject matter of this invention would be adaptable to many other devices which use at least a pair of hydraulically actuated units whose operation is integrated and related. Thus, the system of this invention may be used in a trencher machine wherein the trencher is hydraulically driven and the traction drive for the trencher is also hydraulically driven. The system may also be used in a bottom silo unloader in which one hydraulic motor drives a sweep arm that rotates about the bottom of the silo, and another motor drives a cutter-auger in the sweep arm to cut silage and feed it to the center of the silo where it drops through a hole in the floor for removal from the silo. The correlation in such cases will become obvious as we describe the invention in this particular application.

It is therefore an object of applicant's invention to provide an automatic coordinating and control mechanism for a hydraulic system which will normally provide hydraulic pressure to at least a pair of hydraulic actuators to coordinate all the actuators in the connected system in a predetermined pattern.

It is a further object of applicant's invention to provide a hydraulic system wherein at least a pair of hydraulic actuators may be controlled in interrelated fashion such that a change in conditions for one of the actuators will be automatically compensated for in the other actuator until the normal predetermined operating condition is achieved.

It is a further object of applicant's invention to provide a system for controlling the operation of a pair of hydraulic motors which drive a tool and a tool carrier in such a way that the tool carrier advances the tool into the work only when the tool drive motor produces a predetermined minimum back pressure due to load on the tool.

Yet a further object of applicant's invention is to provide a hydraulic control system in which each of a pair of hydraulic motors is controlled by its individual valve, and back pressure produced by the first motor acts through a pressure coordinating valve to control operation of the second motor independently of the valve for the second motor.

Still another object of the invention is to provide a hydraulic control system in which a coordinating valve opens gradually in response to increasing back pressure produced by load on a first motor, so as to gradually start a second motor, and gradually closes to slow and finally stop the second motor as back pressure from the first motor first approaches and then reaches the top of a predetermined operating pressure range; but in which a sudden surge of back pressure from the first motor can stop the second motor very rapidly.

It is a further object of applicant's invention to provide a pressure responsive bypass valve for automatically coordinationg a pair of hydraulic actuators such that a predetermined relation of operation may be attained and maintained between the hydraulic actuators.

Still a further object is to provide a pressure responsive coordinating valve in which a movable valve piston is urged in one direction by a volute compression spring which provides a positive stop when it is fully compressed so that no other stop for the piston is required.

Description of the drawings

FIG. 1 is a fragmentary side elevational view with parts broken away illustrating the connection of a hydraulic actuated post hole digger having a hydraulically actuated lift cylinder mounted on the rear of a prime mover;

FIG. 2 is a schematic illustration of the conduit connections for the system embodying the concepts of this invention;

FIG. 3 is a longitudinal cross section of the compensating and control member for the system;

FIG. 4 is a transverse section taken substantially along line 4—4 of FIG. 3.

Detailed description of the invention

In accordance with the accompanying drawings and illustrating the particular application of this hydraulic control system a post hole auger generally designated 10 is mounted for vertical oscillation on a prime mover P through a support bar 11 having its ends 11b–11a pivoted respectively on the prime mover P and a portion of the post hole auger 10. Rotary power is delivered to the auger 10 through a hydraulic motor 12 mounted axially to the auger 10. Lifting and lowering power is provided through the support bar 11 to auger 10 through a hydraulic cylinder 13 having one end 13a attached to the support arm 11 with the other end 13b attached to the prime mover P. A source of hydraulic pressure S is provided on the prime mover P and the controls for the hydraulic fluid provided from the source S generally includes a coordinating valve 15, a lift cylinder control valve 16 and an auger control valve 17. Lift valve 16 and auger valve 17 are what is known in the trade as three position valves; the respective positions being up, hold and down for the lift valve 16 and forward, hold and reverse for the auger valve 17. In the hold position the valves provide a bypass situation permitting the flow to pass therearound to establish a continuous flow circuit from H to L, rather than a closed position.

Coordinating valve 15 is illustrated in FIG. 3 and consists generally of a two-part housing comprising an adjustment housing 20 and a valving housing portion 21 securely sealed together with a mounting plate 20a provided on one end of the adjustment housing 20.

Valve housing portion 21 of the valve 15 includes a housing portion having a central passage 21a longitudinally therethrough with an inlet opening 21b on one end thereof for attaching a hydraulic pressure line thereto. An outlet connection 22 is provided in spaced relation from inlet end 21b and is arranged on the outer periphery of housing 21 with a metering passage 23 permitting communication between the outlet 22 and the longitudinal passage 21a through housing 21. An adjustable metering set screw 24 as illustrated in FIG. 4, is provided to control communication through passage 23.

A valve member in the form of a piston 25 is arranged for longitudinal sliding movement within passage 21a and is sealed therein by an O-ring 26 captured by a reduced shoulder portion 25a of valve 25. A pressure passage groove 27 is provided in spaced relation from an inlet end 25b of valve piston 25 intermediate said end and said O-ring 26. This groove is of a predetermined longitudinal length and the internal shoulders 27a–27b forming the groove are beveled. An internal passage conduit 28 is formed centrally of the valve piston 25 from the inlet end 25b of valve 25 and extends upward therethrough to communicate with a radially formed passage conduit 29 which communicates with the pressure passage groove 27. In the normal inoperative position as shown in FIG. 3 the upper shoulder 27b of groove 27 prevents communication between the groove and discharge metering passage 23.

Internally of the adjustment housing 20 an adjustment mechanism generally designated 30 is provided. This mechanism 30 generally includes a handle member 31 extending through top cover 20a and having the lower end 31a thereof in abutting relation with and in controlling communication with a spring retaining and longitudinal guide member 32. Guide member 32 is arranged for longitudinal sliding movement within adjustment housing 20 and has a boss member 32a arranged centrally thereon to receive a spring member 23 thereabout.

Within the opposite end of adjustment housing 20 a valve abutting member 34 is provided and is slidable within adjustment housing 20. A boss 35 on member 34 provides an abutting shoulder 35a for a spring member 33 which is inserted over a smaller centering boss 36.

Spring member 33 is a volute compression spring made up of substantially wide convolutes as would be provided from rolling a wide band into a spring. The end portion 33b of the spring is received about the centering boss 36. This spring is a standard commercially available spring and by using this type of spring no other physical stops to prevent collapse of the adjustment device are necessary. This is due to the fact that complete compression of spring 33 will form a tubular body with the side walls of the spring forming a tubular structure precluding further compression of the spring 33.

The function of the coordinating member 15 will now be described. Tension on the spring 33 is predetermined to make it possible to adjust the spring 33 through handle 31 such that the spring 33 will not compress until a predetermined force or pressure is received longitudinally thereagainst. This pressure is in the form of hydraulic pressure acting on the inlet end 25b of valve piston 25 and received through inlet 21b. At low pressure no fluid will pass from groove 27 into discharge passage 23 due to the closed position of the valve piston 25. Upon reaching the predetermined fluid pressure, spring 33 is compressed and valve piston 25 will be driven upwardly allowing fluid to bypass through passages 28–29, groove 27 and passage 23. Again at a predetermined pressure governed by the longitudinal length of the groove 27 in combination with the spring constant, the lower shoulder 27a of groove 27 will slide upwardly to shut off communication to passage 23. Metering needle 24 further serves to control the discharge fluid.

FIG. 2 illustrates the coordinating features of this system. Lift valve 16 and auger valve 17 are connected in series with a source S with the high pressure line H feeding directly into the lift valve 16 and the low pressure line L receiving fluid from auger valve 17. It should be obvious that this connection from source S could be two parallel connections as no interconnections are made in these lines. First and second pressure lines LL and HL are directed from the lift valve 16 to the lift cylinder 13 to respectively lower and raise the arms 11. Likewise a high pressure line and a low pressure line designated HA and LA are directed from the auger valve 17 to the auger motor 12. A high pressure bypass line designated HC interconnects high pressure line HA with the inlet 21b of the compensator 15. Likewise a high pressure line HD connects outlet 22 of the valve 15 with line LL to feed the lift cylinder 13 and lower the arms. A low pressure line LC connects the second pressure line HL with the low pressure line LA.

As stated, the function of the system shown in this application is to control an automatic post hole digger and an operative description will now be given.

Coordinating valve 15 is preadjusted to operate at an optimum pressure and the auger tip is lowered to the ground by moving lift valve 16 to admit pressure fluid to line LL. Lift valve 16 is now shifted to the hold position and auger valve 17 is placed in the forward position to admit pressure fluid to the line HA. As soon as an initial pressure is built up in the system valve piston 25 of valve 15 is forced upwardly and fluid begins to bypass through passages 28–29, groove 27 and discharge 23 and 22. This bypass fluid is delivered into the line LL from line HD and thus the lift cylinder 13 will force the auger 10 downwardly at a constant rate even though lift valve 16 is in hold position at this time. As lift valve 16 is in hold position and fluid may not pass therethrough, the exhaust from lift cylinder 13 through HL is discharged through bypass line LC to join the discharge from auger line LA. Should the auger 10 run into difficult boring material, the pressure required to turn the auger 10 will increase in proportion to the difficulty of boring. If this pressure build up is sufficient, the added pressure will cause the valve piston 25 to move into its uppermost position and seal discharge 23. In this situation no fluid passes to line HD and thus lift cylinder 13 is inoperative and the total pressure serves to rotate the auger 10 until it frees itself and causes the pressure to drop to likewise allow valve piston 25 to drop, being forced downward by spring 33 to again permit bypass fluid to flow.

It is apparent from the structure of the coordinating valve 15 and the behavior of hydraulic systems that as pressure on the inlet end 25b of the piston 25 gradually increases above the minimum operating pressure established by spring 33, the piston 25 will open only a small amount and thus apply relatively slight operating pressure to the lift cylinder 13 so as to move the auger 10 relatively slowly until the optimum pressure range is reached, at which point the piston 25 will advance the auger at maximum speed. At the upper end of the optimum pressure range, as the shoulder 27a defining the lower end of the groove 27 moves across the discharge passage 23, the advance of the auger may be gradually slowed, or it may be terminated quite rapidly, depending upon the suddenness with which back pressure on the motor 12 increases. This provides considerable flexibility in operation of the system.

It is apparent that the extent of the optimum pressure range depends upon the length of the groove 27 in the piston 25. The bottom of the optimum pressure range is reached when the shoulder 27b passes the top of the discharge passage 23, and the top of the optimum pressure range is reached when the shoulder 27a passes the bottom of the passage 23. As seen in FIG. 3, the length of the groove 27 is substantially greater than the width of the passage 23, so that the structure does provide an optimum maximum pressure range, rather than merely a single maximum pressure point as would be the case if the length of the groove 27 were no greater than the diameter of passage 23.

Line LC is provided between the line HL of lift cylinder 13 and low pressure line LA of motor 12 because when the lift valve 16 is in hold position it will not pass fluid therethrough.

It is possible with this combination for the operator to override the compensating arrangement through operation of the valves 16–17. To lower arm 11 control valve 16 is shifted to the down position. To lift, however, the operator must either stop the auger 10 or must reverse the rotation of the auger 10. Accordingly, a check valve could be inserted in line LC if the operator would ever want to run the auger 10 in the normal digging direction and still lift the auger 10.

Metering screw 24 is provided to allow variations between the capacity of the hydraulic motor 12 as compared to the capacity of the hydraulic cylinder 13. This, of course, will vary with the application and the types and uses of the hydraulic motors which are being coordinated. The metering screw also permits adjustment of the level at which the compensating valve 15 opens and closes without adjusting the spring by changing the passage 23, or for pressures above the level at which the spring would be fully compressed if the passage 23 were fully open.

The advantage of this type of system is, of course, to eliminate the skill of the operator ordinarily required through the usual systems and further that it is possible to obtain and operate the drive engine at a maximum torque by adjusting the coordinating valve such that operation is always at an optimum pressure.

Applications of this type of system and the coordinating valve member are of course numerous. This system may be installed whenever it is desired to integrate and coordinate the movements of at least a pair of hydraulic actuators. The system may be substantially the same as that described for any application.

It will, of course, be understood that various changes may be made in the form, details, arrangements and proportion of parts without departing from the scope of the invention, which generally stated consists in the matter set forth in the appended claims.

I claim:

1. A hydraulic pressure control system for interrelating the actions of at least a pair of hydraulic actuators, said system comprising, in combination:
   a source of hydraulic pressure;
   individual valve means for respectively controlling pressure fluid flow to each of the actuators;
      each of said valve means receiving fluid from the pressure source and having at least a first pressure connection to its respectively controlled actuator; and
   a pressure coordinating member interconnected with the first pressure connection for a first of said actuators for delivery of fluid to the first pressure connection for a second of said actuators, said coordinating member being normally closed but opening in response to back pressure created by the first of said actuators to pass pressure fluid over a predetermined pressure range and closing at the upper limit of said range to permit the entire fluid pressure to be exerted only on said first actuator.

2. The system of claim 1 in which the coordinating member includes a control portion and a resilient member arranged in cooperating controlling relation to said control portion whereby the control portion is normally urged into closed position.

3. The system of claim 2 which includes means for adjusting the tension on said resilient member to thereby adjust the opening pressure for said control portion.

4. The system of claim 2 in which the resilient member is a volute compression spring which, when fully compressed, provides a solid tubular member affording a positive stop for the control portion.

5. The system of claim 1 in which the coordinating member includes a housing, a control piston mounted for sliding movement in said housing in response to said back pressure and having a circumferential fluid carrying groove, and a passage through the side of the housing in an area where it is traversed by said groove during part of the movement of said piston so as to pass fluid from said groove to the first pressure connection for the second actuator; the relationship between said groove and said passage being such that only a small volume of fluid passes through the passage near the lower and upper limits of the predetermined pressure range, whereby the second actuator may operate slowly near both ends of said range and at maximum speed through the middle portion of the range.

6. A hydraulic pressure control system for coordinately operating a tool and feed means for said tool, said system comprising, in combination:
   a first hydraulic actuator for driving said tool;
   a second hydraulic actuator for advancing said feed means;
   a source of hydraulic fluid under pressure;
   a valve for controlling admission of hydraulic pressure fluid from said source to said first actuator;
   and a normally closed pressure coordinating valve which is opened in response to a predetermined back pressure created by operation of said first actuator to admit hydraulic pressure fluid to said second actuator, whereby said feed means is advanced only when said tool is operating under conditions which create at least said predetermined back pressure, said coordinating valve remaining open through a predetermined range of back pressure, and closing when the back pressure reaches a predetermined value to stop the advance of the feed means when load on the tool reaches a predetermined maximum level.

7. The system of claim 6 in which the coordinating valve includes a housing, a control piston mounted for sliding movement in said housing in response to said back pressure and having a circumferential fluid carrying groove, and a passage through the side of the housing in an area where it is traversed by said groove during part of the movement of said piston so as to pass fluid from said groove to the second actuator; the relationship between said groove and said passage being such that only a small volume of fluid passes through the passage near the lower and upper limits of the predetermined pressure range, whereby the second actuator may operate slowly near both ends of said range and at maximum speed through the middle portion of the range.

8. A hydraulic pressure control system for interrelating the actions of a pair of hydraulic actuators comprising, in combination:
   a source of hydraulic pressure;

individual valve means respectively controlling pressure fluid flow to each of the actuators;

each of said valve means having a hold position in which no fluid pressure is delivered to the actuator controlled by it, and at least one actuating position in which fluid pressure is delivered through the valve means to a first pressure connection of the actuator controlled by it; and a pressure coordinating member interconnected with the first pressure connection of a first of said actuators, said member being normally closed but opening in response to back pressure created by said first actuator, and said coordinating member when open being connected to deliver hydraulic pressure to the first pressure connection of said second actuator independently of the valve means for said second actuator.

9. The system of claim 8 in which the pressure coordinating member is constructed and arranged to terminate delivery of hydraulic pressure to the second actuator when back pressure created by the first actuator exceeds a predetermined value.

10. A pressure coordinating valve for controlling the flow of fluid over a predetermined pressure range comprising, in combination:

a valve housing having a fluid inlet opening and a fluid outlet opening;

an adjustment housing at one end of the valve housing;

a valve member slidable in said valve housing toward and from the adjustment housing and having a circumferential fluid flow groove, said member being longitudinally slidable between a first position in which it seals the valve housing against communication between the inlet and outlet openings, a second position in which fluid may pass between said inlet and outlet openings through said groove, and a third position in which it again seals communication between said inlet and outlet openings, said valve member having an inlet end exposed to fluid pressure from the inlet opening and a second end facing the adjustment housing;

means sealing the adjustment housing from the inlet and outlet openings;

compression spring means in the adjustment housing that bears against the second end of the valve member and provides the sole force opposing inlet fluid pressure; and means for adjusting said spring means to vary the force that opposes inlet fluid pressure.

11. The valve of claim 10 in which the inlet is at the end of the valve housing opposite the adjustment housing, and the valve member includes fluid flow passages from the first end of the valve into the fluid flow grooves.

12. The valve of claim 10 in which the outlet opening is in the wall of the valve housing in an area which is traversed by the fluid flow groove of the valve member, said groove being substantially larger than the width of said opening so that maximum fluid flow through said opening may take place throughout a predetermined range.

13. The valve of claim 10 in which the spring means is a volute compression spring which, when fully compressed, provides a solid tubular member affording a positive stop for the valve member.

References Cited

UNITED STATES PATENTS

| | | | |
|---|---|---|---|
| 601,664 | 4/1898 | MacDonald | 137—494 XR |
| 1,959,909 | 5/1934 | Farmer | 137—494 |
| 2,396,001 | 3/1946 | Fischer | 91—12 XR |
| 2,622,372 | 12/1952 | Moulden | 91—61 |
| 2,737,196 | 3/1956 | Eames | 91—412 XR |
| 2,745,253 | 5/1956 | Towler et al. | 91—412 XR |
| 2,905,441 | 9/1959 | Poundstone | 91—412 |
| 2,977,980 | 4/1961 | Scholin | 137—538 |
| 3,237,788 | 3/1966 | Weaver et al. | 214—17.82 |

EDGAR W. GEOGHEGAN, *Primary Examiner.*